(12) United States Patent
Kubota et al.

(10) Patent No.: US 12,097,900 B2
(45) Date of Patent: Sep. 24, 2024

(54) VEHICLE CONTROL DEVICE, VEHICLE CONTROL METHOD, AND NON-TRANSITORY COMPUTER-READABLE RECORDING MEDIUM RECORDING PROGRAM

(71) Applicant: Honda Motor Co., Ltd., Tokyo (JP)

(72) Inventors: Hiroyasu Kubota, Tokyo (JP); Kentaro Kasuya, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 358 days.

(21) Appl. No.: 17/533,136

(22) Filed: Nov. 23, 2021

(65) Prior Publication Data

US 2022/0161849 A1 May 26, 2022

(30) Foreign Application Priority Data

Nov. 24, 2020 (JP) .................................. 2020-194230

(51) Int. Cl.
*B62D 15/02* (2006.01)
(52) U.S. Cl.
CPC ................... *B62D 15/025* (2013.01)
(58) Field of Classification Search
None
See application file for complete search history.

(56) References Cited

U.S. PATENT DOCUMENTS

| 10,510,254 | B2* | 12/2019 | Arndt | G08G 1/166 |
| 2017/0158237 | A1* | 6/2017 | Sakamoto | G05D 1/0246 |
| 2020/0317266 | A1* | 10/2020 | Kunihiro | B62D 15/025 |

FOREIGN PATENT DOCUMENTS

JP 2018091794 6/2018

\* cited by examiner

*Primary Examiner* — Jaime Figueroa
*Assistant Examiner* — Jerrod Irvin Davis
(74) *Attorney, Agent, or Firm* — JCIPRNET

(57) ABSTRACT

A vehicle control device includes a behavior detection part that detects a behavior of a vehicle in front traveling in front of an own vehicle in a same direction as the own vehicle, and a driving control part that performs at least a steering control of the own vehicle without depending on an operation of a driver of the own vehicle. The behavior detection part detects a peak of a lateral speed of the vehicle in front. When the own vehicle is traveling in a straight section, the driving control part executes, at an occurrence point of a lateral position change of the vehicle in front that caused the detected peak, a first steering control that outputs a steering force toward an opposite side of the lateral position change of the vehicle in front or amplifies a steering force output based on a predetermined reference.

18 Claims, 7 Drawing Sheets

VEHICLE CONTROL DEVICE, VEHICLE CONTROL METHOD, AND NON-TRANSITORY COMPUTER-READABLE RECORDING MEDIUM RECORDING PROGRAM

CROSS-REFERENCE TO RELATED APPLICATION

This application claims the priority benefit of Japan application serial no. 2020-194230, filed on Nov. 24, 2020. The entirety of the above-mentioned patent application is hereby incorporated by reference herein and made a part of this specification.

BACKGROUND

Technical Field

The disclosure relates to a vehicle control device, a vehicle control method, and a non-transitory computer-readable recording medium recording a program.

Description of Related Art

Conventionally, an invention of a device that gives an alarm when a strong wind around a traffic sign is estimated by a strong wind estimation part during automatic driving that does not require a driver's driving operation has been disclosed (Patent Document 1). In this device, when a peripheral vehicle wobbles for more than a predetermined amount in the vehicle width direction, or the deviation amount between the estimated position and the detected position of the peripheral vehicle after a predetermined time calculated from the detection behavior amount of the peripheral vehicle exceeds the deviation amount threshold, it is estimated that a strong wind has occurred in the periphery of the traffic sign.

RELATED ART

Patent Document
[Patent Document 1] Japanese Laid-open No. 2018-091794

There are other causes of the wobbling of the vehicle in front besides strong winds, and the countermeasures differ depending on the cause, but the conventional technology is limited to control in preparation for strong winds.

The disclosure has been made in consideration of such circumstances, and provides a vehicle control device, a vehicle control method, and a non-transitory computer-readable recording medium recording a program capable of suppressing disturbance of vehicle behavior due to a lateral gradient of a road surface.

SUMMARY

A vehicle control device, a vehicle control method, and a non-transitory computer-readable recording medium recording a program according to the disclosure adopt the following configurations.

(1): A vehicle control device according to an aspect of the disclosure includes a behavior detection part that detects a behavior of a vehicle in front traveling in front of an own vehicle in a same direction as the own vehicle; and a driving control part that performs at least a steering control of the own vehicle without depending on an operation of a driver of the own vehicle. The behavior detection part detects a peak of a lateral speed of the vehicle in front. When the own vehicle is traveling in a straight section, the driving control part executes, at an occurrence point of a lateral position change of the vehicle in front that caused the detected peak, a first steering control that outputs a steering force toward an opposite side of the lateral position change of the vehicle in front or amplifies a steering force output based on a predetermined reference.

Figure 1:
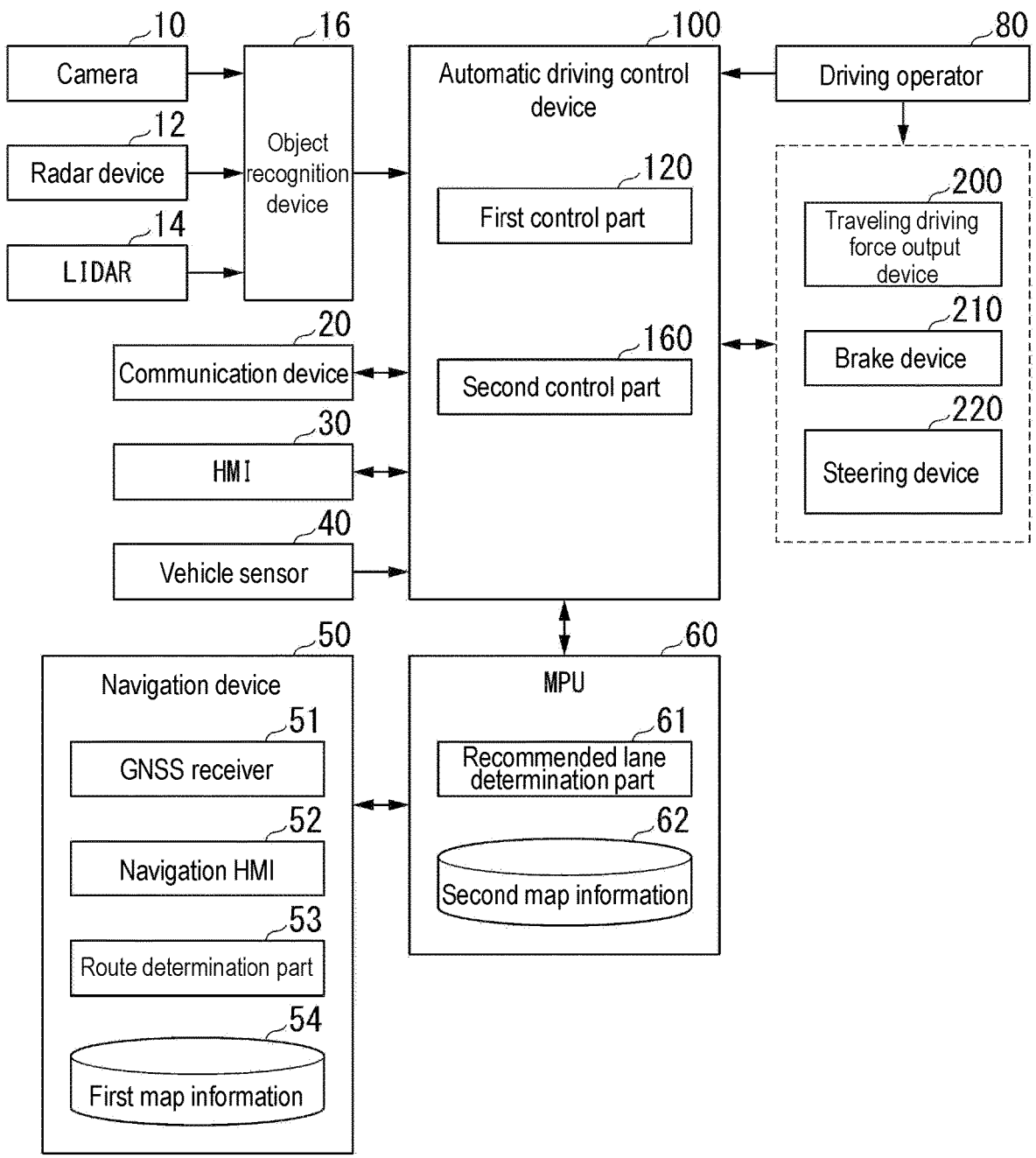
FIG. 1 is a configuration diagram of a vehicle system 1 using a vehicle control device according to the embodiment.

DESCRIPTION OF THE EMBODIMENTS (2): In the aspect of the above (1), the driving control part executes the first steering control when a condition including that a roll amount of the vehicle in front is less than or equal to a second threshold value is satisfied.
(3): In the aspect of the above (1), the driving control part executes the first steering control when a condition including that a lateral movement direction and a roll direction of the vehicle in front are different is satisfied.
(4): In the aspect of the above (1), the driving control part executes the first steering control when a condition including that a change state of the lateral speed of the vehicle in front satisfies a predetermined reference is satisfied.
(5): In the aspect of the above (4), the predetermined reference is that a value of the peak of the lateral speed of the vehicle in front is less than or equal to a third threshold value.
(6): In the aspect of the above (4), the predetermined reference is that a value of a peak of a lateral acceleration of the vehicle in front is less than or equal to a fourth threshold value.
(7): In the aspect of the above (1), the driving control part executes the first steering control when a condition including that a time difference between a timing at which the lateral position of the vehicle in front starts to change and a timing at which a roll occurs is less than or equal to a fifth threshold value is satisfied.
(8): In the aspect of the above (1), the driving control part executes the first steering control when any ones of a plurality of conditions including that a roll amount of the vehicle in front is less than or equal to a second threshold value, that a lateral movement direction and a roll direction of the vehicle in front are different, that a change state of the lateral speed of the vehicle in front satisfies a predetermined condition, and that a time difference between a timing at which the lateral position of the vehicle in front starts to change and a timing at which a roll occurs is less than or equal to a fifth threshold value are satisfied.

(9): In the aspect of the above (1), the driving control part determines the steering force related to the first steering control based on a value of the peak of the lateral speed of the vehicle in front.

(10): In any one of the aspects of the above (2) to (8), the driving control part executes a second steering control different from the first steering control when the condition is not satisfied.

(11): A vehicle control method according to another aspect of the disclosure is one in which a computer mounted in a vehicle: detects a behavior of a vehicle in front traveling in front of an own vehicle in a same direction as the own vehicle, wherein the behavior of the vehicle in front includes a peak of a lateral speed of the vehicle in front; performs at least a steering control of the own vehicle without depending on an operation of a driver of the own vehicle; and when the own vehicle is traveling in a straight section, executes, at an occurrence point of a lateral position change of the vehicle in front that caused the detected peak, a first steering control that outputs a steering force toward an opposite side of the lateral position change of the vehicle in front or amplifies a steering force output based on a predetermined reference.

(12): A non-transitory computer-readable recording medium recording a program according to another aspect of the disclosure is one that makes a computer mounted in a vehicle: detect a behavior of a vehicle in front traveling in front of an own vehicle in a same direction as the own vehicle, wherein the behavior of the vehicle in front includes a peak of a lateral speed of the vehicle in front; perform at least a steering control of the own vehicle without depending on an operation of a driver of the own vehicle; and when the own vehicle is traveling in a straight section, execute, at an occurrence point of a lateral position change of the vehicle in front that caused the detected peak, a first steering control that outputs a steering force toward an opposite side of the lateral position change of the vehicle in front or amplifies a steering force output based on a predetermined reference.

According to the above aspects (1) to (12), it is possible to suppress the disturbance of vehicle behavior due to the lateral gradient of the road surface.

According to the above aspects (2) to (8), it is possible to accurately determine the presence of the lateral gradient of the road surface.

According to the above aspect (9), it is possible to output an appropriate steering force according to the degree of the lateral gradient of the road surface. This is because the value of the peak of the lateral speed of the vehicle in front is considered to represent the degree of the lateral gradient of the road surface.

Hereinafter, embodiments of a vehicle control device, a vehicle control method, and a non-transitory computer-readable recording medium recording a program of the disclosure will be described with reference to the drawings.

[Overall Configuration]

FIG. 1 is a configuration diagram of a vehicle system 1 using a vehicle control device according to the embodiment. The vehicle on which the vehicle system 1 is mounted is, for example, a vehicle such as a two-wheeled vehicle, a three-wheeled vehicle, or a four-wheeled vehicle, and the drive source thereof is an internal combustion engine such as a diesel engine or a gasoline engine, an electric motor, or a combination thereof. The electric motor operates by using the electric power generated by a generator connected to the internal combustion engine or the electric power generated by a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an automatic driving control device 100, a traveling driving force output device 200, a brake device 210, and a steering device 220. These devices and equipment are connected to one another by a multiplex communication line such as a controller area network (CAN) communication line, a serial communication line, a wireless communication network, or the like. Further, the configuration shown in FIG. 1 is merely an example, and a part of the configuration may be omitted or another configuration may be added.

The camera 10 is, for example, a digital camera using a solid-state photographing device such as a charge coupled device (CCD) or a complementary metal oxide semiconductor (CMOS). The camera 10 is attached to any position of the vehicle (hereinafter referred to as the own vehicle M) on which the vehicle system 1 is mounted. When photographing the front, the camera 10 is attached to the upper part of the front windshield, the back surface of the rearview mirror, or the like. The camera 10 cyclically and repeatedly photographs the periphery of the own vehicle M, for example. The camera 10 may be a stereo camera.

The radar device 12 radiates radio waves such as millimeter waves in the periphery of the own vehicle M, and detects radio waves (reflected waves) reflected by an object to detect at least the position (distance and orientation) of the object. The radar device 12 is attached to any position of the own vehicle M. The radar device 12 may detect the position and speed of the object by the frequency modulated continuous wave (FM-CW) method.

The LIDAR 14 irradiates the periphery of the own vehicle M with light (or an electromagnetic wave having a wavelength close to that of light) and measures the scattered light. The LIDAR 14 detects the distance to a target based on the time from light emission to light reception. The emitted light is, for example, a pulsed laser beam. The LIDAR 14 is attached to any position of the own vehicle M.

The object recognition device 16 performs sensor fusion processing on the detection results of a part or all of the camera 10, the radar device 12, and the LIDAR 14, and recognizes the position, type, speed, and the like of the object. The object recognition device 16 outputs the recognition result to the automatic driving control device 100. The object recognition device 16 may output the detection results of the camera 10, the radar device 12, and the LIDAR 14 to the automatic driving control device 100 as they are. The object recognition device 16 may be omitted from the vehicle system 1.

The communication device 20 communicates with other vehicles existing in the periphery of the own vehicle M, or communicates with various server devices via a radio base station by using, for example, a cellular network, a Wi-Fi network, Bluetooth (registered trademark), dedicated short range communication (DSRC), or the like.

The HMI 30 presents various information to an occupant of the own vehicle M and accepts input operations by the occupant. The HMI 30 includes various display devices, speakers, buzzers, touch panels, switches, keys and the like.

The vehicle sensor 40 includes a vehicle speed sensor that detects the speed of the own vehicle M, an acceleration sensor that detects the acceleration, a yaw rate sensor that detects the angular velocity around the vertical axis, an orientation sensor that detects the orientation of the own vehicle M, and the like.

The navigation device 50 includes, for example, a global navigation satellite system (GNSS) receiver 51, a navigation HMI 52, and a route determination part 53. The navigation device 50 holds first map information 54 in a storage device such as a hard disk drive (HDD) or a flash memory. The GNSS receiver 51 specifies the position of the own vehicle M based on the signal received from the GNSS satellite. The position of the own vehicle M may be specified or complemented by an inertial navigation system (INS) using the output of the vehicle sensor 40. The navigation HMI 52 includes display devices, speakers, touch panels, keys, and the like. The navigation HMI 52 may be partially or wholly shared with the above-mentioned HMI 30. The route determination part 53, for example, refers to the first map information 54 to determine a route (hereinafter referred to as the route on the map) from the position of the own vehicle M specified by the GNSS receiver 51 (or any input position) to a destination input by the occupant using the navigation HMI 52. The first map information 54 is, for example, information in which the road shape is expressed by links indicating roads and nodes connected by the links. The first map information 54 may include the road curvature, point of interest (POI) information, and the like. The route on the map is output to the MPU 60. The navigation device 50 may provide route guidance using the navigation HMI 52 based on the route on the map. The navigation device 50 may be realized by, for example, the function of a terminal device such as a smartphone or a tablet terminal owned by the occupant. The navigation device 50 may transmit the current position and the destination to a navigation server via the communication device 20 and obtain a route equivalent to the route on the map from the navigation server.

The MPU 60 includes, for example, a recommended lane determination part 61, and holds second map information 62 in a storage device such as an HDD or a flash memory. The recommended lane determination part 61 divides the route on the map provided by the navigation device 50 into multiple blocks (for example, every 100 m with respect to the vehicle traveling direction), and refers to the second map information 62 to determine the recommended lane for each block. The recommended lane determination part 61 determines which lane from the left to drive. When a branch point exists on the route on the map, the recommended lane determination part 61 determines the recommended lane so that the own vehicle M can travel on a reasonable route to proceed to the branch destination.

The second map information 62 is more accurate map information than the first map information 54. The second map information 62 includes, for example, information on the center of the lane, information on the boundary of the lane, and the like. Further, the second map information 62 may include road information, traffic regulation information, address information (address/zip code), facility information, telephone number information, and the like. The second map information 62 may be updated at any time by the communication device 20 communicating with another device.

The driving operator 80 includes, for example, an accelerator pedal, a brake pedal, a shift lever, a steering wheel, a steering wheel variant, a joystick, and other operators. A sensor for detecting the amount of operation or the presence or absence of operation is attached to the driving operator 80, and the detection result is output to a part or all of the automatic driving control device 100, the traveling driving force output device 200, the brake device 210, and the steering device 220.

The automatic driving control device 100 includes, for example, a first control part 120 and a second control part 160. The first control part 120 and the second control part 160 are realized by, for example, a hardware processor such as a central processing unit (CPU) executing a program (software). In addition, a part or all of these components may be realized by hardware (circuit part; including circuitry) such as a large scale integration (LSI), an application specific integrated circuit (ASIC), a field-programmable gate array (FPGA), or a graphics processing unit (GPU), or may be realized by collaboration between software and hardware. A program may be stored in advance in a storage device (a storage device including a non-transitory storage medium) such as an HDD or a flash memory of the automatic driving control device 100, or may be stored in a removable storage medium such as a DVD or a CD-ROM, and the storage medium (a non-transitory storage medium) may be installed in the HDD or the flash memory of the automatic driving control device 100 by being attached to the drive device. The automatic driving control device 100 is an example of the "vehicle control device," and a combination of an action plan generation part 140 and the second control part 160 is an example of the "driving control part."

Figure 2:
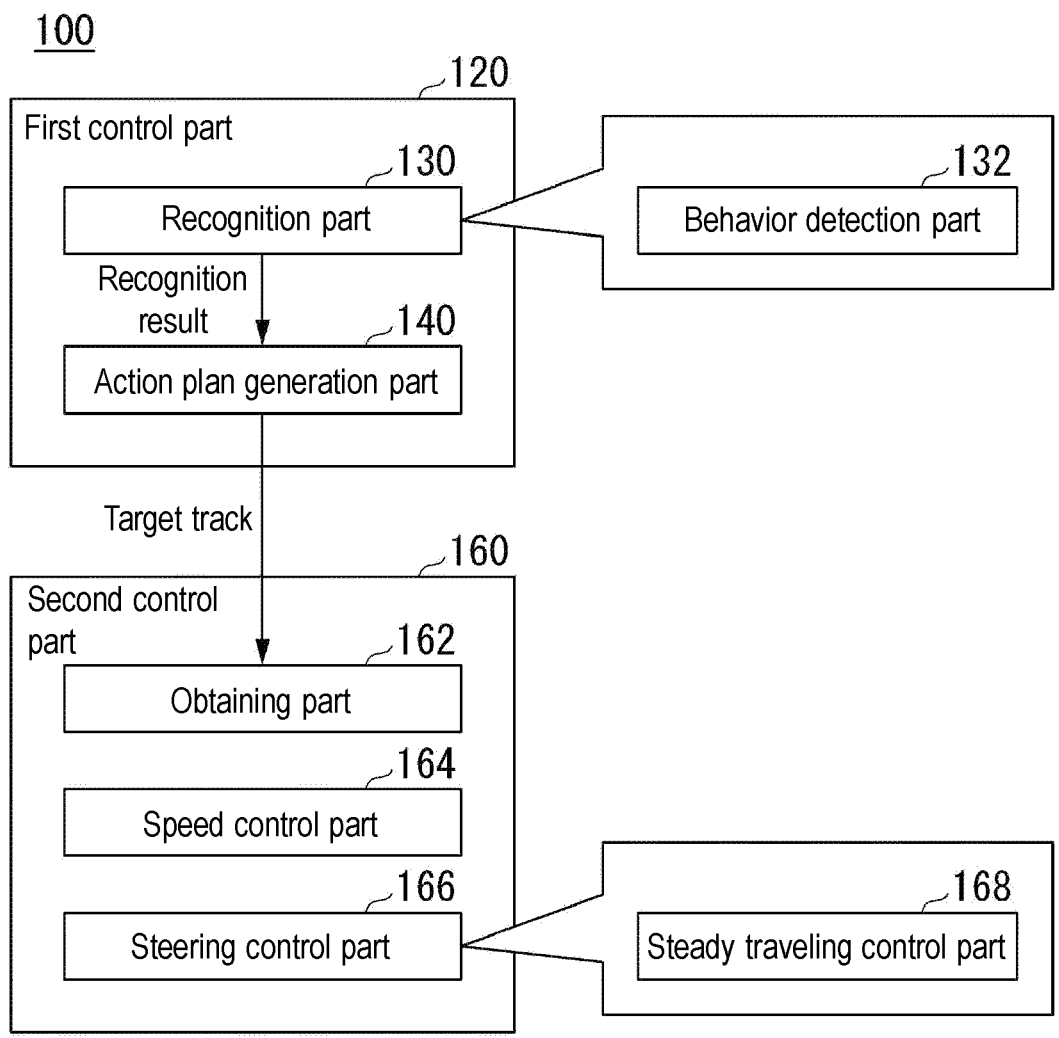
FIG. 2 is a functional configuration diagram of the first control part 120 and the second control part 160.

FIG. 2 is a functional configuration diagram of the first control part 120 and the second control part 160. The first control part 120 includes, for example, a recognition part 130 and the action plan generation part 140. The first control part 120, for example, realizes a function by artificial intelligence (AI) and a function by a model given in advance in parallel. For example, the function of "recognizing an intersection" may be executed in parallel with the recognition of an intersection by deep learning or the like and the recognition based on predetermined conditions (there are signals, road markings, and the like that can be pattern matched), and may be realized by scoring both ways and making a comprehensive evaluation. In this way, the reliability of automatic driving is ensured.

The recognition part 130 recognizes the position, speed, acceleration, and other states of an object in the periphery of the own vehicle M based on the information input from the camera 10, the radar device 12, and the LIDAR 14 via the object recognition device 16. The position of the object is recognized as, for example, a position on absolute coordinates with a representative point (center of gravity, center of drive axis, or the like) of the own vehicle M as the origin, and is used for control. The position of the object may be represented by a representative point such as the center of gravity or a corner of the object, or may be represented by a represented area. The "state" of the object may include the acceleration or jerk of the object, or the "behavioral state" (for example, whether it is changing lanes or is about to change lanes).

Further, the recognition part 130 recognizes, for example, the lane (traveling lane) in which the own vehicle M is traveling. For example, the recognition part 130 recognizes the traveling lane by comparing a road marking line pattern (for example, the arrangement of solid lines and broken lines) obtained from the second map information 62 and a road marking line pattern in the periphery of the own vehicle M recognized from the image photographed by the camera 10. Further, the recognition part 130 may recognize the traveling lane by recognizing not only the road marking line but also the traveling road boundary (road boundary) including the road marking line, the road shoulder, the curb, the median strip, the guardrail, and the like. In this recognition, the position of the own vehicle M obtained from the navigation device 50 and the processing result by the INS may be added. Further, the recognition part 130 also recognizes stop lines, obstacles, red lights, tollhouses, and other road events.

When recognizing the traveling lane, the recognition part 130 recognizes the position and posture of the own vehicle M with respect to the traveling lane. The recognition part 130 may recognize, for example, the deviation of the reference point of the own vehicle M from the center of the lane and the angle formed with respect to a line connecting the center of the lane in the traveling direction of the own vehicle M as the relative position and posture of the own vehicle M with respect to the traveling lane. Alternatively, the recognition part 130 may recognize the position of the reference point of the own vehicle M with respect to any side end part (the road marking line or the road boundary) of the traveling lane as the relative position of the own vehicle M with respect to the traveling lane.

The recognition part 130 further includes a behavior detection part 132 that detects the behavior of the vehicle in front among the objects in the periphery of the own vehicle M. The vehicle in front is a vehicle in front of the own vehicle M (it may mean the front in the same lane exclusively or may be the front including adjacent lanes) that travels in the same direction as the own vehicle M. The details of the function of the behavior detection part 132 will be described later.

The action plan generation part 140 generates a target track in which the own vehicle M will automatically travel in the future (without relying on the driver's operation) so that in principle, the own vehicle M can travel in the recommended lane determined by the recommended lane determination part 61, and is further able to respond to the conditions in the periphery of the own vehicle M. The target track includes, for example, a speed element. For example, the target track is represented as a sequence of points (track points) to be reached by the own vehicle M. The track point is a point to be reached by the own vehicle M for each predetermined mileage (for example, about several meters) along the road, and separately, a target speed and a target acceleration for each predetermined sampling time (for example, about some tenths of a second) are generated as a part of the target track. Further, the track point may be a position to be reached by the own vehicle M at the sampling time for each predetermined sampling time. In this case, the information of the target speed and the target acceleration is expressed by the interval of the track points.

The action plan generation part 140 may set an automatic driving event when generating the target track. The automatic driving event include a constant speed traveling event, a low speed following traveling event, a lane change event, a branching event, a merging event, a takeover event, and the like. The action plan generation part 140 generates the target track according to the activated event.

The second control part 160 controls the traveling driving force output device 200, the brake device 210, and the steering device 220 so that the own vehicle M passes the target track generated by the action plan generation part 140 at the scheduled time.

With reference back to FIG. 2, the second control part 160 includes, for example, an obtaining part 162, a speed control part 164, and a steering control part 166. The obtaining part 162 obtains the information of the target track (orbit point) generated by the action plan generation part 140 and stores it in a memory (not shown). The speed control part 164 controls the traveling driving force output device 200 or the brake device 210 based on a speed element associated with the target track stored in the memory. The steering control part 166 controls the steering device 220 so that the own vehicle M travels along the target track stored in the memory. The steering control part 166 includes a steady traveling control part 168 that functions when a constant speed traveling event, a low speed following traveling event, or the like is executed. The details of the function of the steady traveling control part 168 will be described later.

The traveling driving force output device 200 outputs to the drive wheel a traveling driving force (torque) for the vehicle to travel. The traveling driving force output device 200 includes, for example, a combination of an internal combustion engine, an electric motor, a transmission, and the like, and an electronic control unit (ECU) that controls them. The ECU controls the above configuration according to the information input from the second control part 160 or the information input from the driving operator 80.

The brake device 210 includes, for example, a brake caliper, a cylinder that transmits oil pressure to the brake caliper, an electric motor that generates oil pressure in the cylinder, and a brake ECU. The brake ECU controls the electric motor according to the information input from the second control part 160 or the information input from the driving operator 80 so that the brake torque corresponding to the braking operation is output to each wheel. The brake device 210 may include, as a backup, a mechanism for transmitting the oil pressure generated by the operation of the brake pedal included in the driving operator 80 to the cylinder via a master cylinder. Further, the brake device 210 is not limited to the configuration described above, and may be an electronically controlled oil-pressure brake device that controls an actuator according to the information input from the second control part 160 to transmit the oil pressure of the master cylinder to the cylinder.

The steering device 220 includes, for example, a steering ECU and an electric motor. The electric motor, for example, applies a force to the rack and pinion mechanism to change the direction of the steering wheel. The steering ECU drives the electric motor and changes the direction of the steering wheel according to the information input from the second control part 160 or the information input from the driving operator 80.

Figure 3:
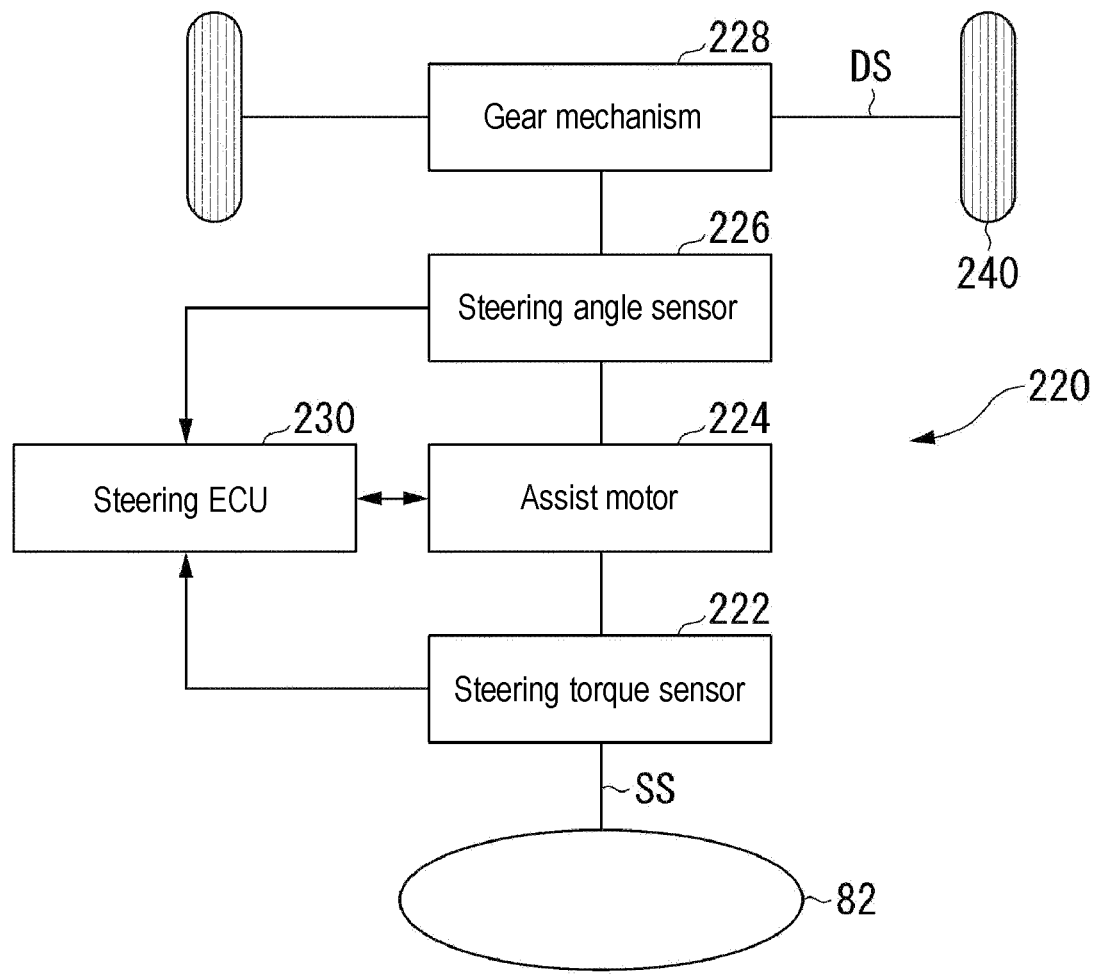
FIG. 3 is a diagram conceptually showing the configuration of the steering device 220.

The steering device 220 is an example of a "steering device." FIG. 3 is a diagram conceptually showing the configuration of the steering device 220. The steering device 220 is connected to a steering wheel 82. The steering device 220 includes a steering torque sensor 222 attached to a steering shaft SS connected to the steering wheel 82, an assist motor 224, a steering angle sensor 226, a gear mechanism 228, and a steering ECU 230. The steering torque sensor 222 detects the direction and magnitude of the force (hereinafter referred to as the steering torque) applied to the steering wheel 82 by the occupant. The assist motor 224 outputs a torque T to the steering shaft SS. The assist motor 224 may be a linear motor or the like that outputs a linear force to a drive shaft DS. The steering angle sensor 226 detects the rotation angle of the steering shaft SS. The gear mechanism 228 converts the rotation of the steering shaft SS into the reciprocating motion of the drive shaft DS, and changes the angle of the wheel 240 connected to the drive shaft DS. The steering ECU 230 drives the assist motor 224 and changes the direction of the steering wheel according to the information input from the second control part 160 or the information input from the driving operator 80. The configuration, disposition, mechanism, and the like of the steering device 220 shown in FIG. 3 are merely examples, and the steering device 220 of any configuration may be provided.

[Control for Lateral Movement Suppression]

Hereinafter, control for suppressing lateral movement (hereinafter referred to as the first steering control) executed by the behavior detection part 132 and the steady traveling control part 168 will be described. The first steering control is executed, for example, at least when the own vehicle M is traveling on a straight road. The first steering control may or may not be executed when the own vehicle M is traveling on a curved road instead of a straight road. The main body that determines whether the own vehicle M is traveling on a straight road may be the behavior detection part 132, the action plan generation part 140, or the steady traveling control part 168. When the behavior detection part 132 is the main body, the behavior detection part 132 determines whether the own vehicle M is traveling on a straight road, and performs peak detection processing to be described later when determining that the own vehicle M is traveling on a straight road. When the action plan generation part 140 or the steady traveling control part 168 is the main body, the behavior detection part 132 continuously performs the peak detection processing, and the action plan generation part 140 or the steady traveling control part 168 determines whether the own vehicle M is traveling on a straight road and executes the first steering control when determining that the own vehicle M is traveling on a straight road. These main bodies determine whether the own vehicle M is traveling on a straight road by analyzing the pattern of the road marking line in the image photographed by the camera 10 and collating the position information of the own vehicle M with the second map information 62. A straight road is defined as, for example, a road having a curvature less than a specified value, a road flagged as a straight road (or not a curved road) in the second map information 62, or the like.

Figure 4:
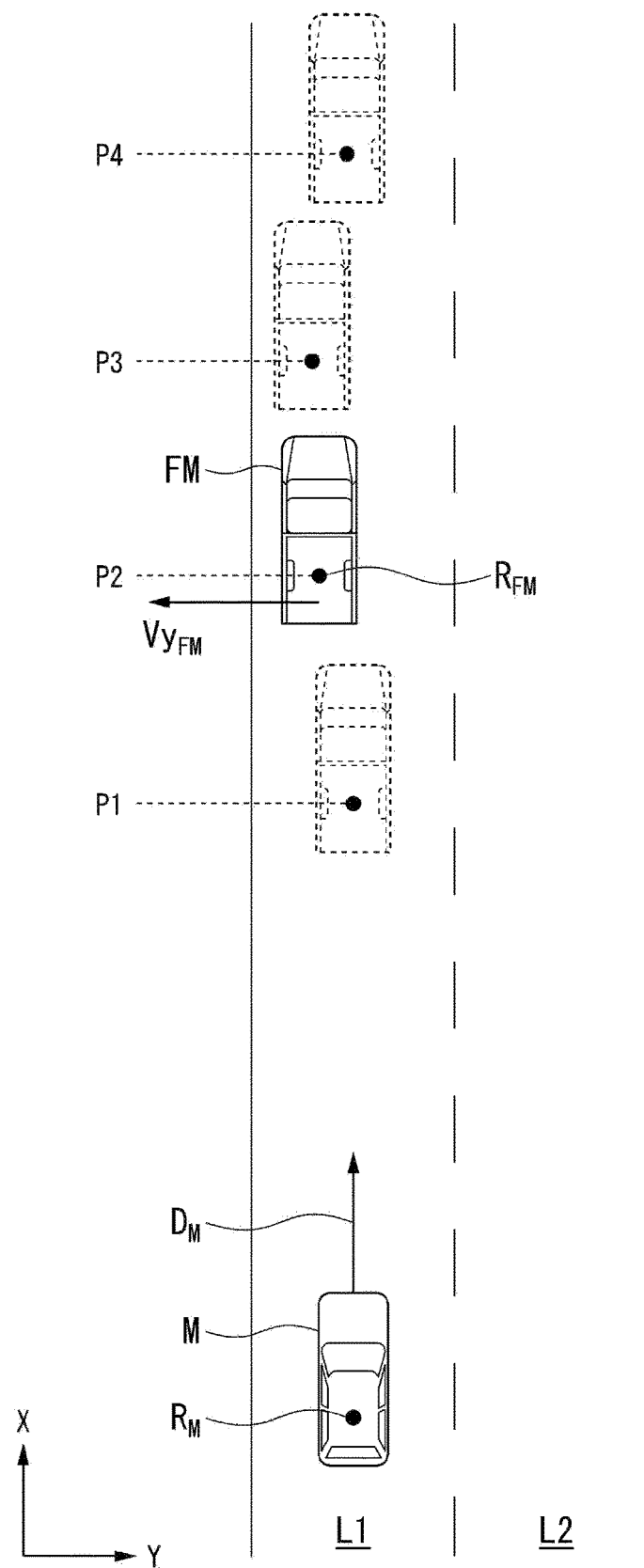
FIG. 4 is a diagram showing an example of a scene in which the first steering control is performed.

FIG. 4 is a diagram showing an example of a scene in which the first steering control is performed. In the figure, the own vehicle M and a vehicle in front FM are traveling in the same lane L1 in the same direction. DM is the traveling direction of the own vehicle M. When the vehicle in front FM reached the point P1 (strictly speaking, it is when the representative point $R_{FM}$ of the vehicle in front FM reaches the point P1, but it is described in the above way), since the lateral gradient of the road surface changed, the vehicle in front FM, which had been traveling straight near the center of the lane, began to move laterally to the left. Next, when the vehicle in front FM reached the point P2, the lateral speed of the vehicle in front FM peaked, and this was detected by the behavior detection part 132. While the vehicle in front FM moves to the points P3 and P4, the driver (or the automatic driving control device) of the vehicle in front FM steers the steering device to the right to return the vehicle in front FM to the center of the lane. The series of behaviors of the vehicle in front FM are detected by the behavior detection part 132. The behavior detection part 132 detects the lateral position (the position in the road width direction, and the position in the Y direction in FIG. 4) of the representative point $R_{FM}$ of the vehicle in front FM for each control cycle, and calculates the lateral movement speed of the representative point $R_{FM}$ as the lateral speed $Vy_{FM}$ of the vehicle in front FM.

In such a situation, when the own vehicle M reached the point P1, which is the occurrence point of the lateral position change of the vehicle in front FM that caused the detected peak (strictly speaking, it is when the representative point $R_M$ of the own vehicle M reached the point P1, but it is described in the above way), the steady traveling control part 168 causes the steering device 220 to output a steering force toward the side opposite to the lateral position change of the vehicle in front FM from the point P1, or amplifies the steering force output based on a predetermined reference. The steady traveling control part 168 sets, for example, a point where the deviation from the average value of the lateral positions of a predetermined number of cycles in the past is greater than or equal to the reference as an occurrence point of the lateral position change of the vehicle in front FM. The representative points of the vehicle in front FM and the own vehicle M are any points defined as desired such as the front end part, the rear end part, the center of gravity, and the center of the rear wheel axle. The steering force additionally determined by the steady traveling control part 168 is added to the basic steering force for traveling along the target track, or acts to amplify some terms in the feedback control for determining the basic steering force. The basic steering force is determined, for example, by the feedback control that reduces the deviation from the target track.

Figure 5:
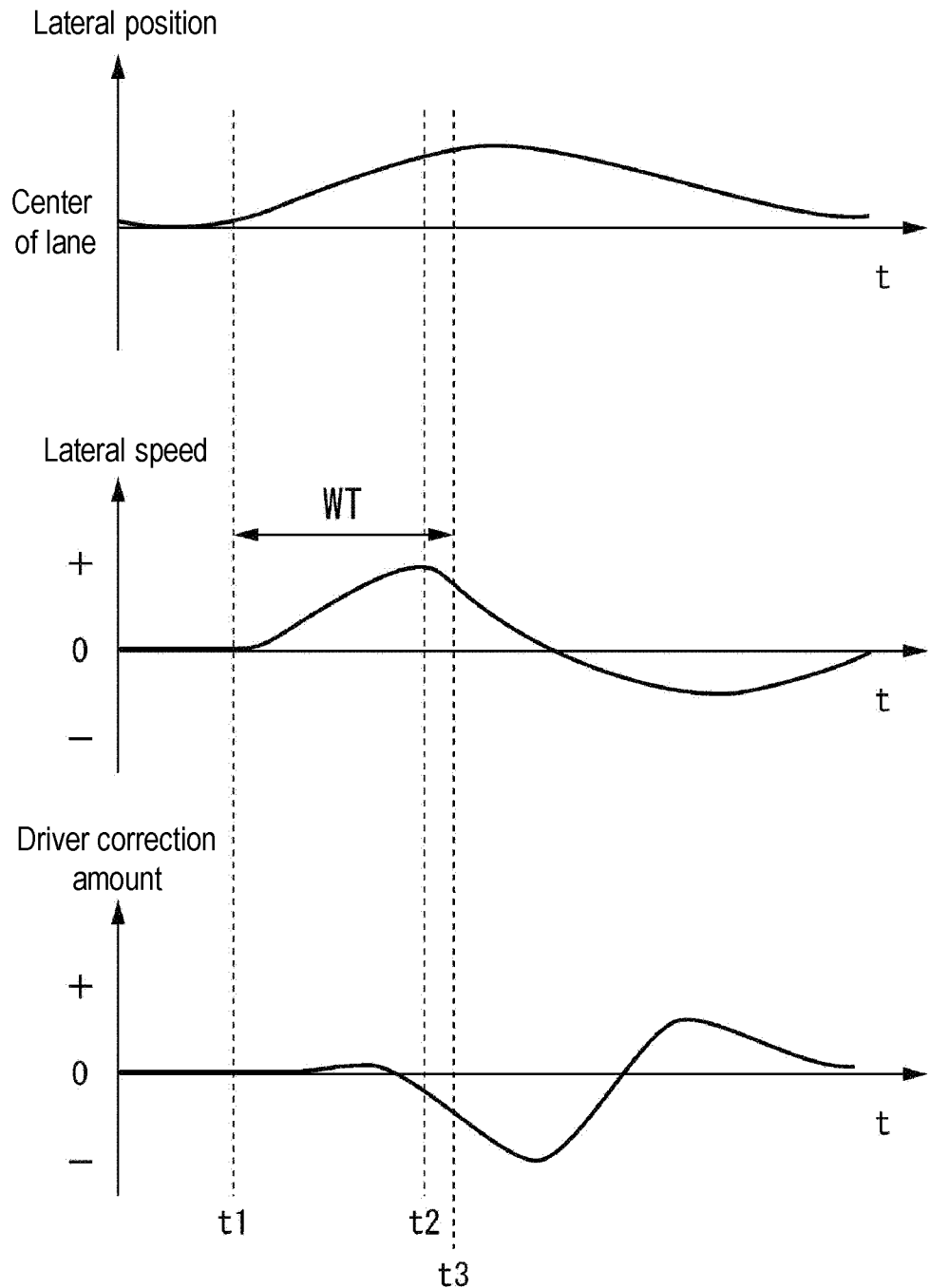
FIG. 5 is a diagram showing temporal changes in the lateral position, lateral speed, and driver correction amount of the vehicle in front FM in the scene shown in FIG. 4.

FIG. 5 is a diagram showing temporal changes in the lateral position, lateral speed, and driver correction amount (direction and amount steered by the driver of the vehicle in front FM) of the vehicle in front FM in the scene shown in FIG. 4. The lateral position uses the center of the lane as the reference, and the lateral speed and the driver correction amount are expressed with one of the left and right sides as positive and the other side as negative. The time t1 is the time when the vehicle in front FM has passed the point P1. Later, the point where the vehicle in front FM exists at the time t1 is determined to be the occurrence point of the lateral position change of the vehicle in front FM due to the change in the lateral gradient of the road surface. The time t2 is the time when the vehicle in front FM has passed the point P2. When the time elapses to the time t3, it is determined that the lateral speed $Vy_{FM}$ of the vehicle in front FM at the time t2 in the window period (observation period) WT that goes back a predetermined number of control cycles in the past from that time is the maximum value that appears other than the start point and the end point within the window period. Therefore, the lateral speed $Vy_{FM}$ of the vehicle in front FM at the time t2 is detected as a peak value. After that, since it is assumed that the driver of the vehicle in front FM performs the steering operation so as to resist the lateral gradient of the road surface, the lateral position of the vehicle in front FM returns to the vicinity of the center of the lane.

Figure 6:
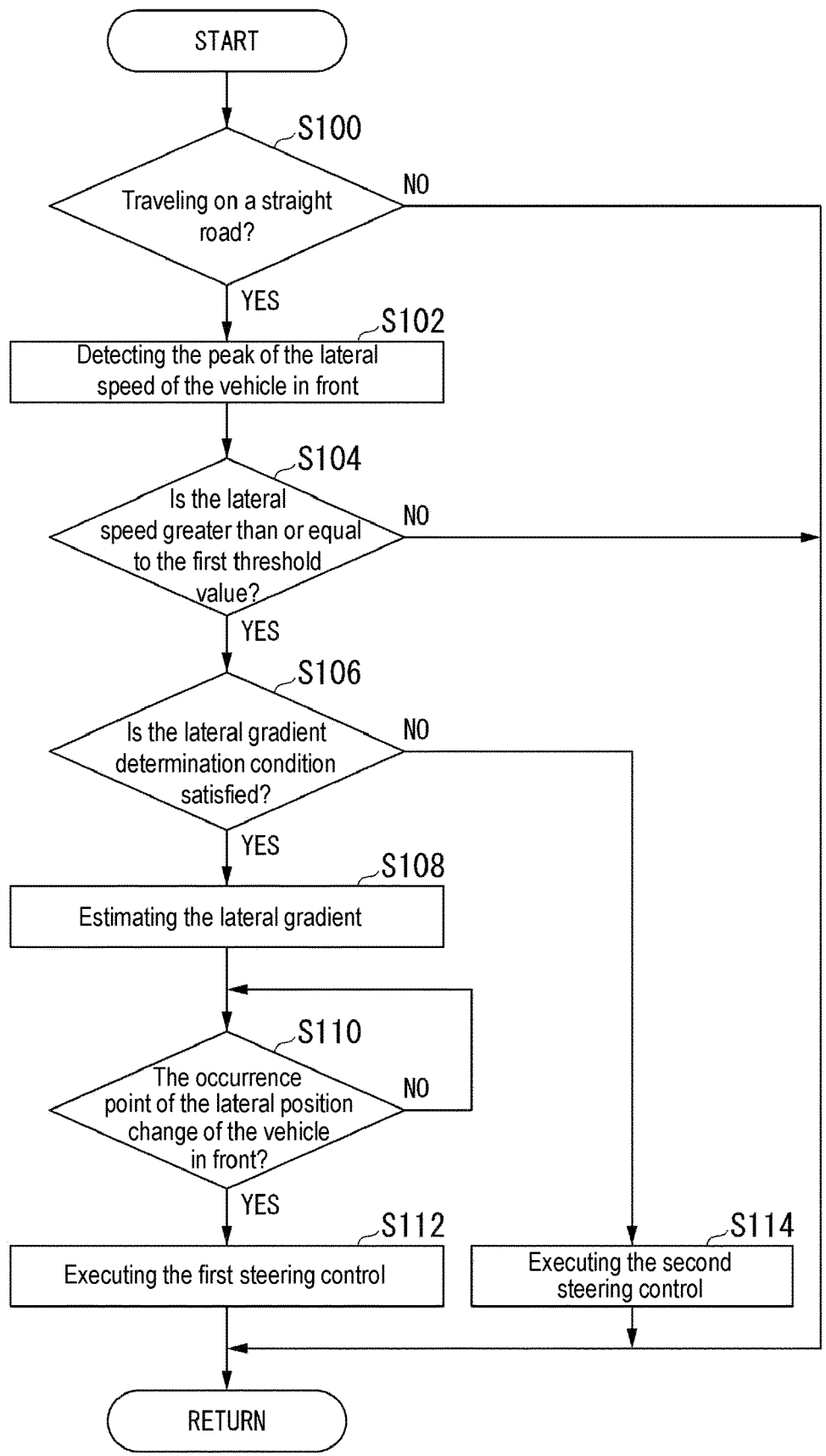
FIG. 6 is a flowchart showing an example of a processing flow executed by the automatic driving control device 100.

FIG. 6 is a flowchart showing an example of a processing flow executed by the automatic driving control device 100. The processing of this flowchart is, for example, repeatedly executed at a predetermined cycle. First, the automatic driving control device 100 determines whether the own vehicle M is traveling on a straight road (step S100). When it is determined that the own vehicle M is traveling on a straight road, the behavior detection part 132 detects the peak of the lateral speed $Vy_{FM}$ of the vehicle in front FM (step S102), and determines whether the lateral speed $Vy_{FM}$ (peak value) of the vehicle in front FM related to the peak is greater than or equal to a first threshold value Th1 (step S104).

When it is determined in step S100 that the vehicle is not traveling on a straight road, and when it is determined in step S104 that the lateral speed is less than the first threshold value Th1, one routine of this flowchart ends.

When it is determined that the lateral speed related to the peak is greater than or equal to the first threshold value Th1, the steady traveling control part 168 determines whether the lateral gradient determination condition is satisfied (step S106). The lateral gradient determination condition is an example of the "condition" in the claims. The lateral gradient determination condition includes a part or all of the first to fourth conditions shown below. That is, the steady traveling control part 168 may simply determine that the lateral gradient determination condition is satisfied when the first condition is satisfied, may simply determine that the lateral gradient determination condition is satisfied when the second condition is satisfied, may simply determine that the lateral gradient determination condition is satisfied when the third condition is satisfied, or may simply determine that the lateral gradient determination condition is satisfied when the fourth condition is satisfied. Further, the lateral gradient determination condition may be a combination of any ones of these conditions under the AND condition, or may be a combination of them under the OR condition.

(First Condition)

Figure 7:
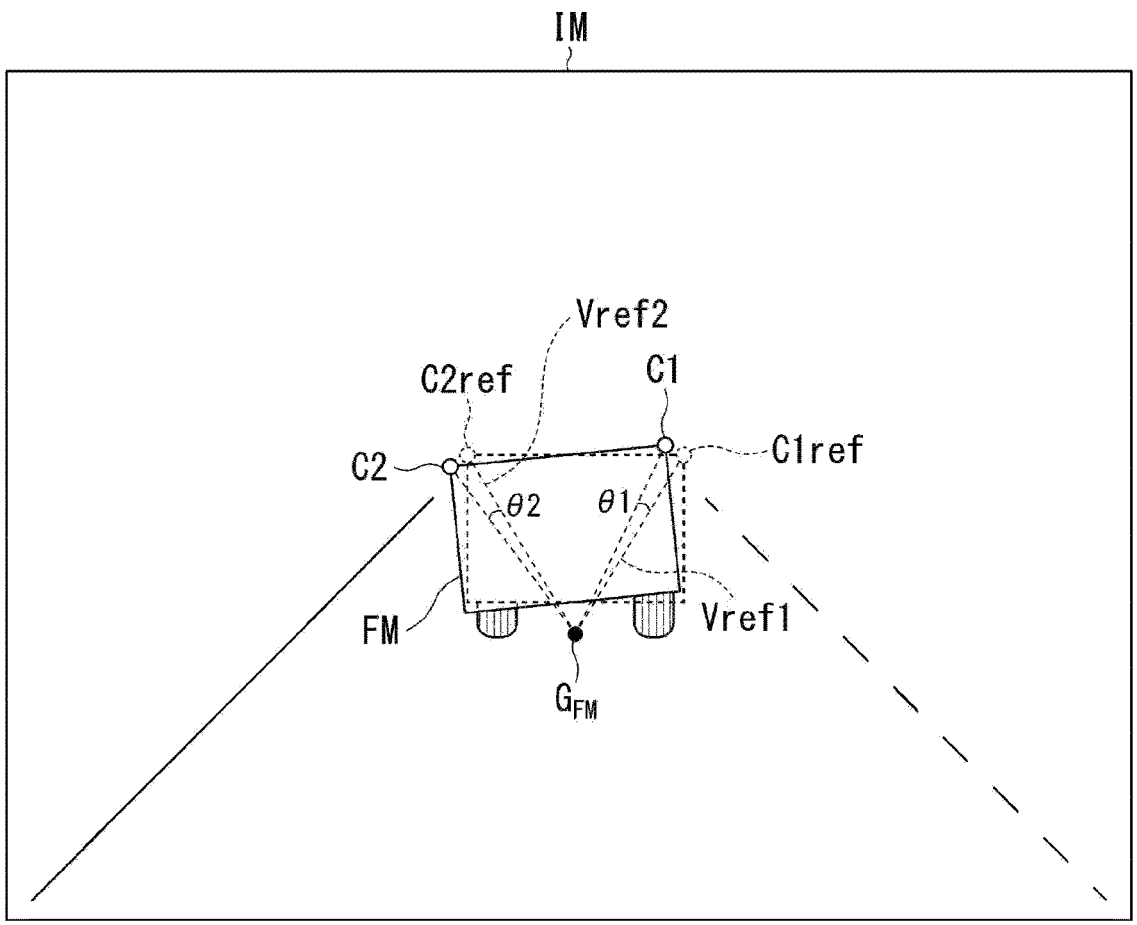
FIG. 7 is a diagram for illustrating the roll amount $\theta r$.

The first condition is that the roll amount θr of the vehicle in front FM is less than or equal to a second threshold value Th2. The roll amount θr of the vehicle in front FM is detected, for example, as a relative value with a period when the fluctuation is small as the reference. The behavior detection part 132 continuously detects feature points such as the upper right corner and the upper left corner of the vehicle in front FM to detect the roll amount. FIG. 7 is a diagram for illustrating the roll amount θr. In the figure, IM is an image photographed by the camera 10; C1 is the upper right corner; and C2 is the upper left corner. For example, the behavior detection part 132 sets a virtual roll center $G_{FM}$ of the vehicle in front FM on the road surface; obtains in advance the vector Vref1 from the virtual roll center $G_{FM}$ to the reference upper right corner C1ref and the vector Vref2 from the virtual roll center $G_{FM}$ to the reference upper left corner C2ref in a steady state (a state in which the roll amount θr does not fluctuate); obtains the angle θ1 formed by the vector from the virtual roll center $G_{FM}$ to the upper right corner C1 and the vector Vref1 and the angle θ2 formed by the vector from the virtual roll center $G_{FM}$ to the upper left corner C2 and the vector Vref2 at the time of detection; and sets the average value of the angle θ1 and the angle θ2 as the roll amount θr. The second threshold value Th2 is set to a value greater than the general roll amount caused by the lateral gradient and less than the general roll amount caused by the lateral wind. Therefore, when the first condition is satisfied, it is considered that the probability that the vehicle in front FM rolled due to the lateral gradient of the road surface is greater than the probability that the vehicle in front FM rolled due to the lateral wind. Further, the recognition part 130 may be able to recognize the vehicle type (large vehicle, medium vehicle, small vehicle, sports car, wagon, truck, bus, and the like) of the vehicle in front FM. In this case, the second threshold value Th2 may be different for each vehicle type. This is because the roll amount due to the lateral wind differs depending on the performance of the suspension of the vehicle and the like.

(Second Condition)

The second condition is that the lateral movement direction and the roll direction of the vehicle in front FM are different. Generally, when the vehicle in front FM rolls due to the lateral wind, the direction is the same as the lateral movement direction of the vehicle in front FM. On the other hand, when the vehicle in front FM rolls due to the lateral gradient of the road surface, the direction is not always the same as the lateral movement direction of the vehicle in front FM. Therefore, when the second condition is satisfied, it is considered that the probability that the vehicle in front FM rolled due to the lateral gradient of the road surface is greater than the probability that the vehicle in front FM rolled due to the lateral wind.

(Third Condition)

The third condition is that the change state of the lateral speed $Vy_{FM}$ of the vehicle in front FM satisfies a predetermined reference. The predetermined reference is, for example, that the peak of the lateral speed $Vy_{FM}$ of the vehicle in front FM is less than or equal to a third threshold value Th3. The third threshold value Th3 is set to a value between the peak of the lateral speed $Vy_{FM}$ due to the lateral gradient of the road surface and the peak of the lateral speed $Vy_{FM}$ due to the lateral wind. Further, the third condition may be that the peak of the lateral acceleration $d(Vy_{FM})/dt$ is less than or equal to a fourth threshold value Th4. The fourth threshold value Th4 is set to a value between the peak of the lateral acceleration due to the lateral gradient of the road surface and the peak of the lateral acceleration due to the lateral wind. Therefore, when the third condition is satisfied, it is considered that the probability that the lateral speed $Vy_{FM}$ occurs in the vehicle in front FM due to the lateral gradient of the road surface is greater than the probability that the lateral speed $Vy_{FM}$ occurs in the vehicle in front FM due to the lateral wind. The determination according to the third condition may not be based on the peak of the lateral speed or the lateral acceleration that occurs first in a first direction, but may be based on the lateral speed or lateral acceleration that occurs in a second direction opposite to the first direction after the peak occurs. That is, the determination may be in the same manner as described above based on the lateral speed or lateral acceleration when the driver of the vehicle in front FM tries to return the lateral position of the vehicle in front to the original position by steering operation after the vehicle in front FM moves to one side due to the lateral wind or the lateral gradient of the road surface. Since the change in the lateral position of the vehicle in front FM due to the lateral wind occurs more steeply than the change due to the lateral gradient of the road surface, it is assumed that the driver of the vehicle in front FM reflexively performs a steep steering return operation.

(Fourth Condition)

The fourth condition is that the time difference between the timing at which the lateral position of the vehicle in front FM starts to change (for example, the timing at which the value changes to greater than or equal to a predetermined value during the observation period) and the timing at which the roll occurs (for example, the timing at which the roll amount θr changes to greater than or equal to a predetermined value during the observation period) is less than or equal to a fifth threshold value Th5. When the lateral position change and the roll occur due to the lateral gradient of the road surface, they occur substantially at the same time, whereas when the lateral position change and the roll occur due to the lateral wind, the roll occurs first, followed by the delayed lateral position change. Therefore, when the fourth condition is satisfied, it is considered that the probability that the lateral position change and the roll occur due to the lateral gradient of the road surface is greater than the probability that the lateral position change and the roll occur due to the lateral wind.

Figure 8:
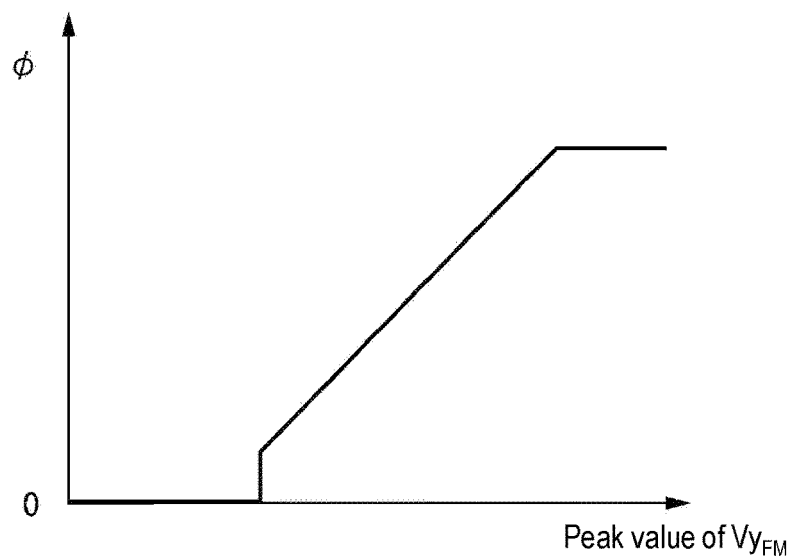
FIG. 8 is a diagram illustrating an estimation rule of the lateral gradient $\phi$ of the road surface.

When it is determined in step S106 that the lateral gradient determination condition is satisfied, the steady traveling control part 168 estimates the lateral gradient φ of the road surface (step S108). The steady traveling control part 168 estimates the lateral gradient ϕ of the road surface based on, for example, the peak value of the lateral speed $Vy_{FM}$ of the vehicle in front FM. FIG. 8 is a diagram illustrating an estimation rule of the lateral gradient ϕ of the road surface. The lateral gradient ϕ may be a value expressed in the unit of %, or a value expressed in the unit of an angle. The steady traveling control part 168 estimates that the greater the peak value of the lateral speed $Vy_{FM}$, the greater the lateral gradient ϕ. However, the steady traveling control part 168 may estimate that the lateral gradient ϕ is zero with the peak value of the lateral speed $Vy_{FM}$ from zero to a first reference value A1 as a dead zone, and may fix the lateral gradient ϕ to the upper limit value when the peak value of the lateral speed $Vy_{FM}$ exceeds a second reference value A2. In this way, it is possible to prevent excessive control from being performed due to false detection.

The steady traveling control part 168 may be provided with the estimation characteristics illustrated in FIG. 7 for each vehicle type. This is because the peak value of the lateral speed $Vy_{FM}$ caused with respect to the lateral gradient ϕ of the road surface differs depending on the performance of the suspension of the vehicle in front FM and the like.

Next, the steady traveling control part 168 waits until the own vehicle M reaches the occurrence point of the lateral position change of the vehicle in front FM that caused the peak detected in step S102 (step S110), and executes the first steering control when the own vehicle M reaches the point (step S112). The first steering control is a control that causes the steering device 220 to output a steering force toward the side opposite to the lateral position change of the vehicle in front FM from the occurrence point of the lateral position change of the vehicle in front FM, or amplifies the steering force output based on a predetermined reference.

For example, the above-described basic steering force St is determined by, for example, the PID control represented by the equation (1).

Δy is the deviation between the position of the own vehicle M and the target track in the road width direction; Kp is the gain of the proportional term; Kd is the gain of the differential term; and Ki is the gain of the integral term.

$$St = Kp \cdot \Delta y + Kd \cdot \Delta y/dt + Ki \cdot \int \Delta y \, dt \quad (1)$$

In this case, the first steering control is, for example, a control that determines the steering force St # to be output by adding the feedforward term Kc to the basic steering force St as shown in the equation (2).

$$St \, \# = Kc + Kp \cdot \Delta y + Kd \cdot \Delta y/dt + Ki \cdot \int \Delta y \, dt \quad (2)$$

Further, the first steering control may be, for example, a control that replaces the gain Ki of the integral term in the basic steering force St with a greater value Ki # as shown in the equation (3). As a result, the steering force in the opposite direction is output in response to the Δy generated by the lateral movement of the own vehicle M due to the lateral gradient of the road surface in the downward direction of the gradient being constantly increased. That is, the steering force toward the opposite side of the lateral position change of the vehicle in front FM is amplified. The gain Ki of the original integral term may be set to zero, and the gain Ki # of the integral term may have a value according to the execution of the first steering control. Further, the first steering control may be a control that changes the gain Kp of the proportional term to a greater value, or changes the gain Ki of the integral term and the gain Kp of the proportional term to a greater value.

$$St \, \# = Kc + Kp \cdot \Delta y + Kd \cdot \Delta y/dt + Ki \, \# \int \Delta y \, dt \quad (3)$$

Here, it is assumed that the own vehicle M has already reached or passed the "occurrence point" at the time when the step S110 is reached, but in that case, the first steering control may be started from the time when the step S110 is reached.

When it is determined in step S106 that the lateral gradient determination condition is not satisfied, the steady traveling control part 168 executes a second steering control different from the first steering control (step S114). The second steering control is a steering control for suppressing the wobbling of the own vehicle M due to the lateral wind. For example, it is a control for outputting the steering reaction force (meaning the force acting in the opposite direction to the torque generated on the steering shaft SS by the driver's operation or the force from the road surface) to the assist motor 224 or increasing the gain of the steering reaction force. Since the influence of the lateral wind occurs suddenly in a short time, it is possible to effectively suppress the wobbling of the own vehicle M by outputting the steering reaction force. Unlike the configuration of FIG. 3, the steering device 220 may include a motor dedicated to the reaction force output.

As described above, in the embodiment, the content of the control is different between the control in response to the lateral gradient of the road surface and the control in response to the lateral wind, and it is possible to suppress the wobbling of the own vehicle M in various situations.

In the processing described above, the lateral position change of the vehicle in front FM is classified into either one exclusively caused by the lateral gradient of the road surface or one caused by the lateral wind, and the steering control is performed. However, the lateral position change of the vehicle in front FM may occur in the process of changing lanes, or may be caused by intentionally offset driving with respect to the lane due to poor visibility because of a large vehicle in front. For this reason, the steady traveling control part 168 may cancel at least the first steering control (A) when it is estimated that the vehicle in front is trying to change lanes, such as when the direction indicator is activated or when the vehicle in front is moving laterally across the road lane markings (or it is predicted from the history of lateral position change), or (B) when it is estimated that the vehicle in front is traveling in an offset way, such as when the deviation from the center of the lane is stable and for a long period of time.

According to the embodiments described above, the vehicle control device includes the behavior detection part (132) that detects the behavior of the vehicle in front FM traveling in front of the own vehicle M in the same direction as the own vehicle M, and the driving control part (140, 160) that performs at least the steering control of the own vehicle M without depending on the operation of the driver of the own vehicle M. The behavior detection part detects the peak of the lateral speed $Vy_{FM}$ of the vehicle in front FM. When the own vehicle M is traveling in a straight section, the driving control part executes, at the occurrence point P1 of the lateral position change of the vehicle in front FM that caused the detected peak, the first steering control that outputs the steering force toward the opposite side of the lateral position change of the vehicle in front FM or amplifies the steering force output based on a predetermined reference. Therefore, it is possible to suppress the disturbance of the vehicle behavior due to the lateral gradient of the road surface.

In the above embodiments, the vehicle control device is applied to the automatic driving control device, but the vehicle control device may be applied to a driving support device that mainly executes a steering control such as a lane keeping assist system (LKAS). In this case, the driving support device may extract the peak of the lateral speed of the vehicle in front while maintaining the vehicle in the center of the lane and outputting the steering force so that the vehicle can travel, and may execute, at the occurrence point of the lateral position change of the vehicle in front that caused the peak, the first steering control that outputs the steering force toward the opposite side of the lateral position change of the vehicle in front or amplifies the steering force output based on a predetermined reference.

The embodiments described above can be expressed as follows.

A vehicle control device is configured to include:
a storage device that stores a program; and
a hardware processor;
when the hardware processor executes the program stored in the storage device, it is made to:
detect a behavior of a vehicle in front traveling in front of an own vehicle in a same direction as the own vehicle, wherein the behavior of the vehicle in front includes a peak of a lateral speed of the vehicle in front;
perform at least a steering control of the own vehicle without depending on an operation of a driver of the own vehicle; and
when the own vehicle is traveling in a straight section, execute, at an occurrence point of a lateral position change of the vehicle in front that caused the detected peak, a first steering control that outputs a steering force toward an opposite side of the lateral position change of the vehicle in front or amplifies a steering force output based on a predetermined reference.

Although embodiments for implementing the disclosure have been described above by the embodiments, the disclosure is not limited to these embodiments, and various modifications and replacements may be added without departing from the spirit of the disclosure.

What is claimed is:

1. A vehicle control device, comprising:
a behavior detection part that detects a behavior of a vehicle in front traveling in front of an own vehicle in a same direction as the own vehicle; and
a driving control part that performs at least a steering control of the own vehicle without depending on an operation of a driver of the own vehicle,
wherein the behavior detection part detects a peak of a lateral speed of the vehicle in front, and
when the own vehicle is traveling in a straight section, the driving control part waits until the own vehicle reaches an occurrence point of a lateral position change of the vehicle in front that caused the detected peak, and executes, at the occurrence point of the lateral position change of the vehicle in front that caused the detected peak, a first steering control that outputs a steering force toward an opposite side of the lateral position change of the vehicle in front or amplifies a steering force output based on a predetermined reference.

2. The vehicle control device according to claim 1, wherein the driving control part executes the first steering control when a condition comprising that a roll amount of the vehicle in front is less than or equal to a second threshold value is satisfied.

3. The vehicle control device according to claim 2, wherein the driving control part executes a second steering control different from the first steering control when the condition is not satisfied.

4. The vehicle control device according to claim 1, wherein the driving control part executes the first steering control when a condition comprising that a lateral movement direction and a roll direction of the vehicle in front are different is satisfied.

5. The vehicle control device according to claim 4, wherein the driving control part executes a second steering control different from the first steering control when the condition is not satisfied.

6. The vehicle control device according to claim 1, wherein the driving control part executes the first steering control when a condition comprising that a change state of the lateral speed of the vehicle in front satisfies a predetermined reference is satisfied.

7. The vehicle control device according to claim 6, wherein the predetermined reference is that a value of the peak of the lateral speed of the vehicle in front is less than or equal to a third threshold value.

8. The vehicle control device according to claim 7, wherein the driving control part executes a second steering control different from the first steering control when the condition is not satisfied.

9. The vehicle control device according to claim 6, wherein the predetermined reference is that a value of a peak of a lateral acceleration of the vehicle in front is less than or equal to a fourth threshold value.

10. The vehicle control device according to claim 9, wherein the driving control part executes a second steering control different from the first steering control when the condition is not satisfied.

11. The vehicle control device according to claim 6, wherein the driving control part executes a second steering control different from the first steering control when the condition is not satisfied.

12. The vehicle control device according to claim 1, wherein the driving control part executes the first steering control when a condition comprising that a time difference between a timing at which the lateral position of the vehicle in front starts to change and a timing at which a roll occurs is less than or equal to a fifth threshold value is satisfied.

13. The vehicle control device according to claim 12, wherein the driving control part executes a second steering control different from the first steering control when the condition is not satisfied.

14. The vehicle control device according to claim 1, wherein the driving control part executes the first steering control when any ones of a plurality of conditions comprising that a roll amount of the vehicle in front is less than or equal to a second threshold value, that a lateral movement direction and a roll direction of the vehicle in front are different, that a change state of the lateral speed of the vehicle in front satisfies a predetermined condition, and that a time difference between a timing at which the lateral position of the vehicle in front starts to change and a timing at which a roll occurs is less than or equal to a fifth threshold value are satisfied.

15. The vehicle control device according to claim 14, wherein the driving control part executes a second steering control different from the first steering control when the condition is not satisfied.

16. The vehicle control device according to claim 1, wherein the driving control part determines the steering force related to the first steering control based on a value of the peak of the lateral speed of the vehicle in front.

17. A vehicle control method, wherein a computer mounted in a vehicle:

detects a behavior of a vehicle in front traveling in front of an own vehicle in a same direction as the own vehicle, wherein the behavior of the vehicle in front comprises a peak of a lateral speed of the vehicle in front;

performs at least a steering control of the own vehicle without depending on an operation of a driver of the own vehicle; and when the own vehicle is traveling in a straight section, waits until the own vehicle reaches an occurrence point of a lateral position change of the vehicle in front that caused the detected peak, and executes, at the occurrence point of the lateral position change of the vehicle in front that caused the detected peak, a first steering control that outputs a steering force toward an opposite side of the lateral position change of the vehicle in front or amplifies a steering force output based on a predetermined reference.

18. A non-transitory computer-readable recording medium recording a program that makes a computer mounted in a vehicle:

detect a behavior of a vehicle in front traveling in front of an own vehicle in a same direction as the own vehicle, wherein the behavior of the vehicle in front comprises a peak of a lateral speed of the vehicle in front;

perform at least a steering control of the own vehicle without depending on an operation of a driver of the own vehicle; and when the own vehicle is traveling in a straight section, wait until the own vehicle reaches an occurrence point of a lateral position change of the vehicle in front that caused the detected peak, and execute, at the occurrence point of the lateral position change of the vehicle in front that caused the detected peak, a first steering control that outputs a steering force toward an opposite side of the lateral position change of the vehicle in front or amplifies a steering force output based on a predetermined reference.

* * * * *